US012304795B2

(12) United States Patent
Paolo et al.

(10) Patent No.: US 12,304,795 B2
(45) Date of Patent: May 20, 2025

(54) ASEPTIC APPARATUS FOR FILLING AND CLOSING ALUMINIUM RECEPTACLES

(71) Applicant: GEA PROCOMAC S.p.A., Sala Baganza (IT)

(72) Inventors: Abelli Paolo, Sala Baganza (IT); Casappa Luigi, Mamiano (IT); Comani Andrea, Sala Baganza (IT)

(73) Assignee: GEA PROCOMAC S.p.A., Sala Baganza (IT)

(*) Notice: Subject to any disclaimer, the term of this patent is extended or adjusted under 35 U.S.C. 154(b) by 0 days.

(21) Appl. No.: 18/177,053

(22) Filed: Mar. 1, 2023

(65) Prior Publication Data

US 2023/0312322 A1 Oct. 5, 2023

(30) Foreign Application Priority Data

Apr. 5, 2022 (IT) ........................ 102022000006704

(51) Int. Cl.
*B67C 7/00* (2006.01)
*B67C 3/24* (2006.01)
*B67C 3/22* (2006.01)

(52) U.S. Cl.
CPC .............. *B67C 7/004* (2013.01); *B67C 3/242* (2013.01); *B67C 2003/228* (2013.01); *B67C 2007/006* (2013.01); *B67C 2007/0066* (2013.01)

(58) Field of Classification Search
CPC ......... B65B 55/027; B67C 3/02; B67C 3/225; B67C 7/0073; B67C 7/004;
(Continued)

(56) References Cited

U.S. PATENT DOCUMENTS 3,687,261 A * 8/1972 Guckel ................. B65B 55/027 198/723
2012/0317924 A1* 12/2012 Gueguen ............... B65B 55/027 53/167

(Continued)

FOREIGN PATENT DOCUMENTS

DE 19727942 A1 1/1999
DE 19806520 A1 8/1999

(Continued)

OTHER PUBLICATIONS

Search Report received in connection with Italian Application No. 102022000006704, dated Nov. 2, 2022.

*Primary Examiner* — Eyamindae C Jallow
(74) *Attorney, Agent, or Firm* — Barnes & Thornburg, LLP; Tina M. Dorr

(57) ABSTRACT

An aseptic apparatus for filling and closing an aluminium receptacle. The aseptic apparatus may include a filling unit, which includes a first chamber, and at least one transfer star-wheel downstream the filling unit. The aseptic apparatus may also include a closures placing station arranged on a first zone of the transfer star-wheel that is located beside the filling unit. The closures placing station may be configured to place a concave closure onto a mouth of each receptacle. The aseptic apparatus may also include a closing unit arranged downstream from the transfer star-wheel. The closing unit may include a second chamber housing a closing machine that is configured to apply each concave closure around a neck of the corresponding receptacle. The first chamber may be at a first pressure and the second chamber may be at a second pressure that is lower than the first pressure.

11 Claims, 4 Drawing Sheets

(58) Field of Classification Search
CPC ...... B67C 2003/228; B67C 2003/2688; B67C 3/242; B67C 2007/006; B67C 2007/0066
See application file for complete search history.

(56) References Cited

U.S. PATENT DOCUMENTS

| | | | | |
|---|---|---|---|---|
| 2015/0059288 A1* | 3/2015 | Wu | B65B 55/027 53/167 |
| 2015/0107190 A1* | 4/2015 | Zambaux | B25J 21/02 53/287 |
| 2015/0317924 A1* | 11/2015 | Park | G05D 1/0088 40/213 |
| 2017/0312977 A1* | 11/2017 | Pagliarini | B29C 49/06 |

FOREIGN PATENT DOCUMENTS

| | | | | |
|---|---|---|---|---|
| DE | 202018104454 U1 | | 8/2018 | |
| EP | 2279850 A1 | | 2/2011 | |
| EP | 3118131 A1 | * | 1/2017 | B65C 3/16 |
| WO | WO-2015023924 A2 | * | 2/2015 | B65B 3/003 |
| WO | WO-2017072352 A1 | * | 5/2017 | B65B 55/027 |

* cited by examiner

ASEPTIC APPARATUS FOR FILLING AND CLOSING ALUMINIUM RECEPTACLES

FIELD

The present relates to an aseptic apparatus for filling and closing Aluminium receptacles.

BACKGROUND

Use of Aluminium as a material for producing containers has increased in the last years. In fact, Aluminium has a lower environmental impact than plastic, as well as higher recyclability properties.

SUMMARY

An aseptic apparatus for filling and closing an aluminium receptacle. The aseptic apparatus may include a filling unit, which includes a first chamber, and at least one transfer star-wheel downstream the filling unit. The aseptic apparatus may also include a closures placing station arranged on a first zone of the transfer star-wheel that is located beside the filling unit. The closures placing station may be configured to place a concave closure onto a mouth of each receptacle. The aseptic apparatus may also include a closing unit arranged downstream from the transfer star-wheel. The closing unit may include a second chamber housing a closing machine that is configured to apply each concave closure around a neck of the corresponding receptacle. The first chamber may be at a first pressure and the second chamber may be at a second pressure that is lower than the first pressure.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
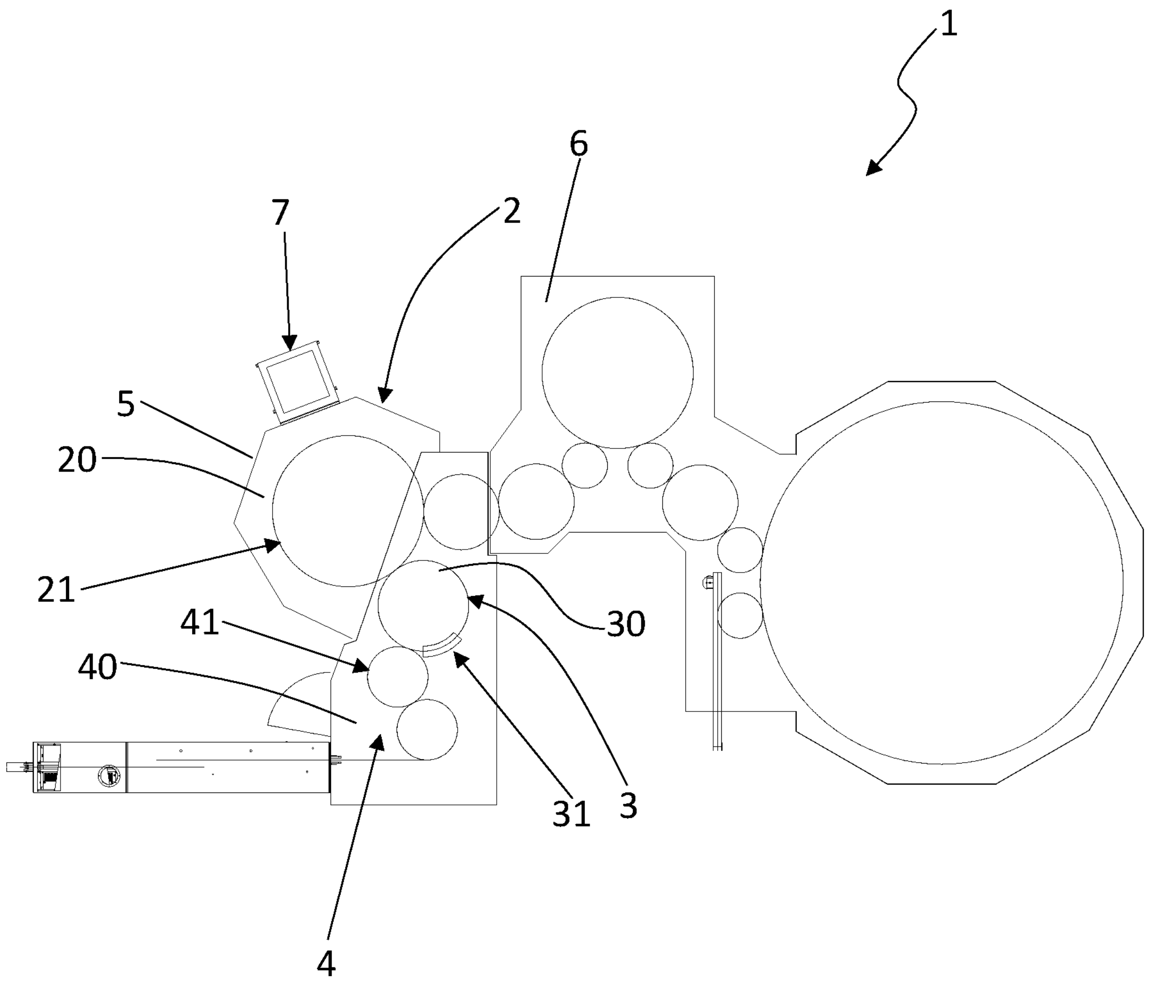
FIG. 1 illustrates an aseptic apparatus for filling and closing Aluminium receptacles, according to the present, in a plant view.
Figure 2:
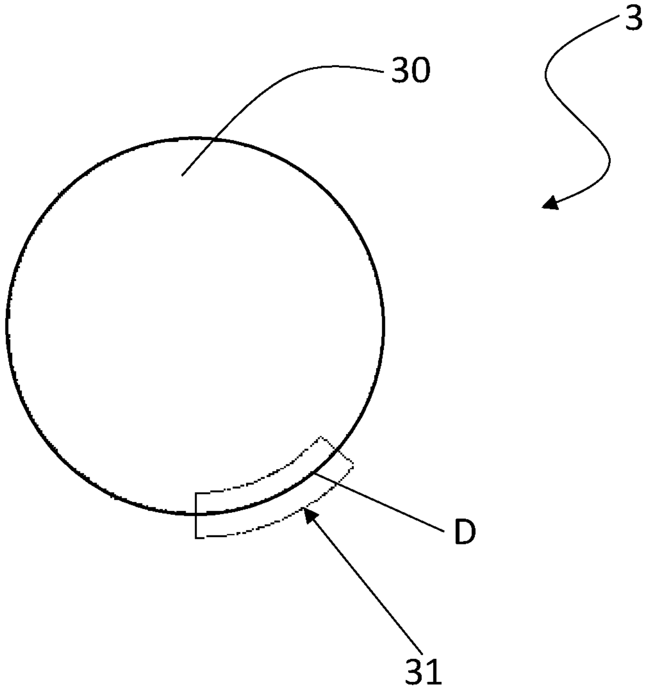
FIG. 2 illustrates the transfer star-wheel of the apparatus of FIG. 1.

In the bottling of so-called "sensitive" food products, i.e., products which are particularly sensitive to bacteriological contamination and oxidation, such as isotonic beverages, juices, nectars, soft drinks, tea, milk-based beverages, coffee-based beverages, etc., for which avoiding possible microbiological contamination throughout all the packaging steps is of fundamental importance.

In a bottling line with aseptic technology it is of importance to control contamination in the various work stations (forming, filling, capping, etc.), thus it is essential to ensure adequate filtering of the fluids to be introduced into the controlled environment, correct management of the pressures of the various areas in order to control the path of any unwanted particles, correct monitoring of the environment, correct management and adequate quality of the cleaning and sterilization cycles of the internal parts of the machine (C.I.P., acronym for "Cleaning In Place" and S.I.P., acronym for "Sterilization In Place"), or of the external parts of the machine (C.O.P., acronym for "Cleaning Out of Place" and S.O.P., acronym for "Sterilization Out of Place").

In this context, there is felt the need to develop an aseptic bottling line using Aluminium receptacles instead of thermoplastic receptacles.

Nevertheless, the use of Aluminium receptacles raises some issues that need to be considered when designing new aseptic bottling lines.

First, closures for Aluminium bottles are produced without a thread. By contrast, thread in a closure is created during the application on the bottle by a capping head. In fact, the threaded neck of the Aluminium bottle is used to generate a thread in the closure.

This is done by a capping machine that is quite more complex than a traditional capping machine used for applying closures to plastic bottles. The object of the present is to propose an aseptic apparatus for filling and closing Aluminium receptacles in which sterility is assured, without increasing the overall complexity.

Another object of the present is to propose an aseptic apparatus for filling and closing Aluminium receptacles where maintenance operations are easy to be carried out.

The stated technical task and specified aims are substantially achieved by an aseptic apparatus for filling and closing Aluminium receptacles, the aseptic apparatus comprising:

- a filling unit comprising a first chamber housing a filling machine that is configured to receive the receptacles and to inject a product within the receptacles;
- at least one transfer star-wheel downstream the filling unit;
- a closures placing station arranged on a first zone of the transfer star-wheel that is located beside the filling unit, the closures placing station being configured to place a concave closure onto a mouth of each receptacle;
- a closing unit downstream the transfer star-wheel, the closing unit comprising a second chamber housing a closing machine that is configured to apply each concave closure around a neck of the corresponding receptacle;
- air supplying means for supplying sterile air to the first chamber and to the second chamber, the air supplying means being configured to supply air in such a way that the first chamber is at a first pressure and the second chamber is at a second pressure, the second pressure being lower than the first pressure.

According to an aspect of one or more embodiments, the first pressure is comprised between 20 Pa and 50 Pa, and the second pressure is comprised between 5 Pa and 30 Pa.

According to one aspect of one or more embodiments, the aseptic apparatus further comprises:

- a tunnel starting downstream the closures placing station, the tunnel surrounding a volume partially extending above the mouths of the receptacles travelling towards the closing unit;
- further air supply means for supplying sterile air within the volume delimited by said tunnel so as to create a sterile air flow substantially orthogonal to a development direction of the tunnel.

According to one or more embodiments, the tunnel has a development direction that is substantially parallel to an advancing path of the receptacles on the transfer star-wheel so that the tunnel surrounds a volume partially extending above the mouths of the receptacles advancing on the transfer star-wheel.

According to one or more embodiments, the tunnel is configured to enwrap at least partially the neck and the concave closure applied on each receptacle advancing on the transfer star-wheel along the advancing path.

According to one or more embodiments, the tunnel is configured to enwrap completely the neck and the concave closure applied on each receptacle advancing on the transfer star-wheel along the advancing path.

According to an aspect of one or more embodiments, the tunnel is located above the receptacles advancing on the transfer star-wheel along the advancing path.

In particular, the tunnel has a U-shaped cross-section.

According to one or more embodiments, the aseptic apparatus further comprises a guide element located under the tunnel and having an elongated extension in a direction that is parallel to the developing direction of the tunnel.

In particular, the guide element is configured to maintain the concave closures placed on the receptacles advancing on the transfer star-wheel along the advancing path.

In one example, the guide element is configured to contact the concave closures placed on the receptacles advancing on the transfer star-wheel along the advancing path.

According to an aspect of one or more embodiments, the closures placing station comprises a plurality of guides arranged in such a way as to place said concave closures from on high on the mouth of the receptacles and at least a plane able to exert pressure onto the concave closures once placed on the mouth of the receptacles.

According to an aspect of one or more embodiments, the aseptic apparatus further comprises an isolator adapted to define a controlled-contamination and sterile environment. The filling unit, the transfer star-wheel, the closures placing station and the closing unit are arranged inside the isolator.

With reference to the figures, number 1 denotes an aseptic apparatus for filling and closing Aluminium receptacles 100, in particular Aluminium bottles.

The apparatus 1 comprises a filling unit 2, at least one transfer star-wheel 3 arranged downstream the filling unit 2 and a closing unit 4 arranged downstream the transfer star-wheel 3.

The apparatus 1 further comprises an isolator 5 adapted to define a controlled-contamination and sterile environment 6.

The filling unit 2, the transfer star-wheel 3 and the closing unit 4 are located within the isolator 5, thus inside the controlled-contamination and sterile environment 6.

The filling unit 2 comprises a first chamber 20 housing a filling machine 21 that is configured to receive the receptacles 100 and to inject a product therein.

Preferably, the filling machine 21 is of the rotating carousel type. Alternatively, the filling machine 21 is of the linear type.

The apparatus 1 further comprises a closures placing station 30 arranged on a first zone of the transfer star-wheel 3 that is located beside the filling unit 2.

In other words, the closures placing station 30 is just downstream the filling unit 2 so as to receive the receptacles 100 from the filling unit 2.

According to one or more embodiments, the closures placing station 30 is configured to place a concave closure 200 onto a mouth 100*a* of each receptacle 100.

According to one or more embodiments, the closures placing station 30 is configured to place and press a concave closure 200 onto a mouth 100*a* of each receptacle 100.

In particular, the closing placing station 30 is located within the isolator 5, thus inside the controlled-contamination and sterile environment 6.

Figure 5:
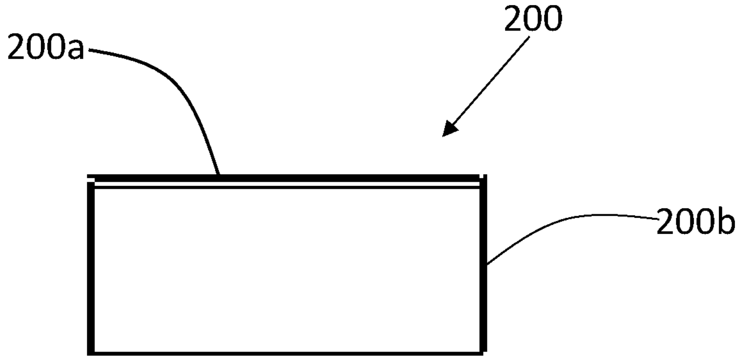
FIG. 5 illustrates a concave closure in a cross-sectional view.
Figure 6:
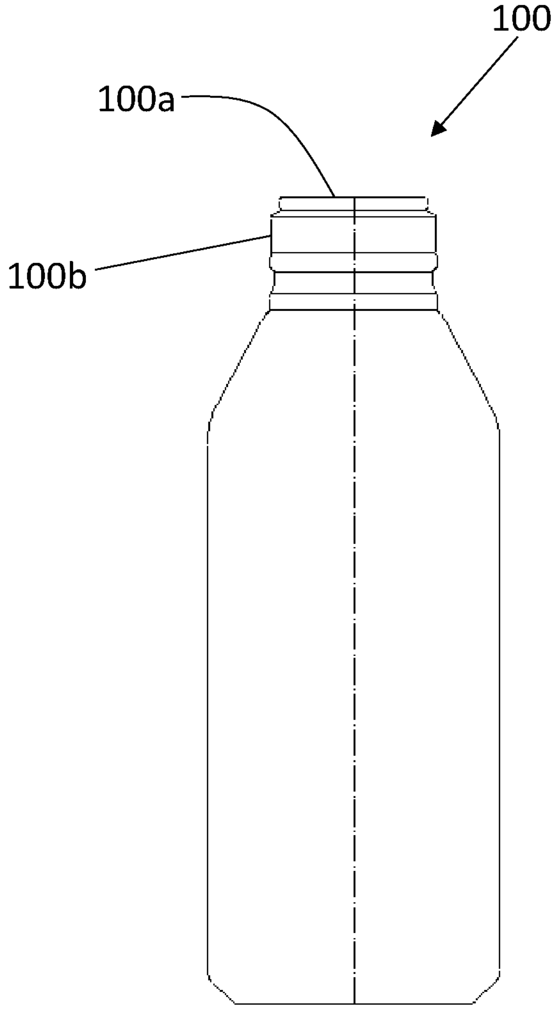
FIG. 6 illustrates an aluminium receptacle processed in the apparatus of FIG. 1.

In this context, by concave closure 200 is meant a capsule or a cap comprising a base 200*a* and a lateral surface 200*b* which extends from the base 200*a* and defines therewith a cavity (see FIG. 5).

On the opposite side of the base 200*a*, the concave closure 200 has an opening destined to receive the neck 100*b* of a receptacle 100.

In the closures placing station 30 each concave closure 200 is preferably rested on the mouth 100*a* of the corresponding receptacle 100.

According to one or more embodiments, the concave closure 200 is also pressed on the mouth 100*a* of the corresponding receptacle 100.

According to one or more embodiments, each concave closure 200 is dropped from above on the mouth 100*a* of the receptacle 100 by means of guides. In the bottling sector, this is referred-to as "a la volèe", or "on the fly". The pressing of the concave closure 200 on the mouth 100*a* is done by means of an upper guide or an inclined plane encountered by the receptacle 100 during movement thereof.

For example, the inclined plane is the lower plane of a circular sector located above the mouths 100*a* of the receptacles 100.

The "on the fly" gripping concept is well known, for example in non-aseptic capping machines and will therefore not be further detailed herein.

The closing unit 4 comprises a second chamber 40 housing a closing machine 41 that is configured to apply each concave closure 200 around a neck 100*b* of the corresponding receptacle 100.

In the closing machine 41 each concave closure 200 is applied to the neck 100*b* of the corresponding receptacle 100 in such a way as to seal it and make the seal definitive. In particular, a thread is created in the concave closure 200 during the application on the neck 100*b* of the receptacle 100, that is externally threaded.

Preferably, the closing machine 41 is of the rotating carousel type. Alternatively, the closing machine 41 is of the linear type.

The apparatus 1 further comprises air supplying means 7 for supplying sterile air to the first chamber 20 and to the second chamber 40.

The air supplying means 7 are configured to supply air so that a first pressure is established in the first chamber 20, and a second pressure is established in the second chamber 40.

Advantageously, the second pressure established in the second chamber 40 is lower than the first pressure established in the first chamber 20.

According to an aspect of the, the first pressure is comprised between 20 Pa and 50 Pa and the second pressure is comprised between 5 Pa and 30 Pa.

In this context, the pressure values shall be intended as overpressure values, i.e. they are relative pressure values.

These different values of overpressure are used to prevent contaminants from travelling towards critical areas. In fact, the overpressure established in the first chamber 20 containing the filling machine 21 (which is more critical) gives rise to an air flow towards the second chamber 40 containing the closing machine 4 (less critical), so limiting contaminants from travelling in an opposite direction, i.e. from the second chamber 40 to the first chamber 20.

According to an aspect of the, the aseptic apparatus 1 further comprises a tunnel 31 starting downstream the closures placing station 30.

Preferably, the tunnel 31 has a development direction D that is substantially parallel to an advancing path of the receptacles 100 on the transfer star-wheel 3.

According to an aspect of the, the tunnel 31 surrounds a volume partially extending above the mouth 100*b* of the receptacles 100 advancing on the transfer star-wheel 3.

In particular, the tunnel 31 has a U-shaped cross-section.

According to an aspect of the, the tunnel 31 is located in a second zone of the transfer star-wheel 3, that is immediately downstream the first zone of the transfer star-wheel 3.

In particular, the tunnel 31 extends so as to cover a circumferential arch of the transfer star-wheel 3.

The apparatus 1 comprises further air supply means for supplying sterile air within the volume delimited by the tunnel 31 so as to create a sterile air flow 17 substantially orthogonal to the development direction D. The direction of the air flow is illustrated by the arrowed lines in FIG. 44.

The further air supply means 17 may be separated or connected to or part of the air supply means 7.

According to one or more embodiments, the tunnel 31 is configured to enwrap at least partially the neck 100*b* and the concave closure 200 placed on each receptacle 100 advancing on the transfer star-wheel 3 along the advancing path.

Figure 3:
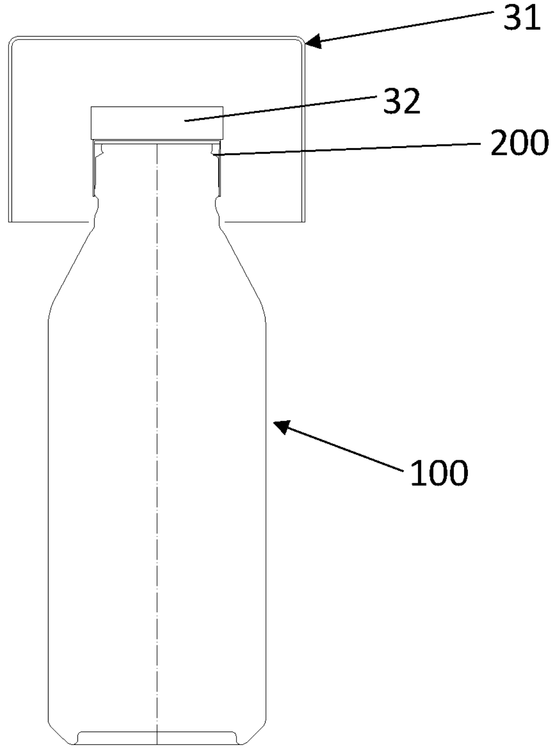
FIG. 3 illustrates the tunnel of the apparatus of FIG. 1, according to one or more embodiments, in a cross-sectional view.

Preferably, as illustrated in FIG. 3, the tunnel 31 completely enwraps the neck 100*b* and the concave closure 200 placed on each receptacle 100 advancing on the transfer star-wheel 3 along the advancing path.

Preferably, the apparatus 1 further comprises a guide element 32 located within the tunnel 31 and having an elongated extension in a direction that is parallel to the developing direction D of the tunnel 31.

In practice, the guide element 32 follows the development of the tunnel 31.

The guide element 32 is configured to avoid misplacements of the concave closures 200 applied on the receptacles 100 advancing on the transfer star-wheel 3 along the advancing path. Indeed, when the receptacles 100 are moving on the transfer star-wheel 3, the concave closures 200 are simply placed on their mouths 100*a* but not yet applied.

Preferably, the guide element 32 is a solid body having a substantially flat surface that is distanced from the concave closures 200.

In one or more embodiments, the guide element 32 is a solid body having substantially a flat surface that it is adapted to contact the concave closures 200.

In particular, the guide element 32 is made of metal, for example steel, or made of plastic.

Figure 4:
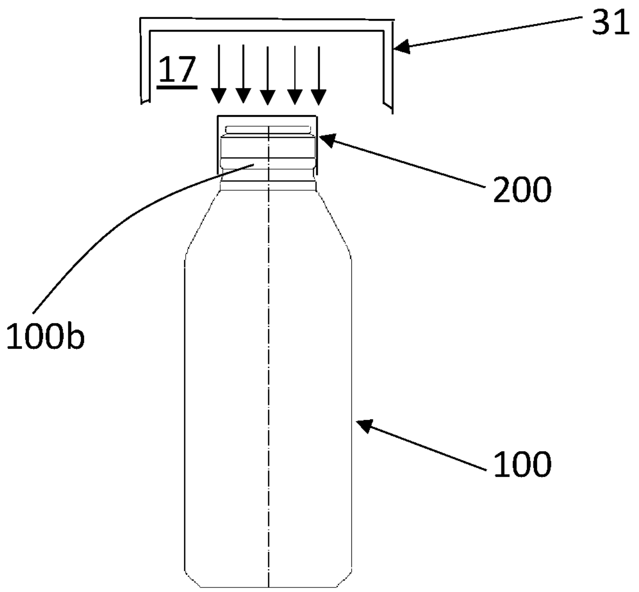
FIG. 4 illustrates the tunnel of the apparatus of FIG. 1, according to one or more embodiments, in a cross-sectional view.

According to one or more embodiments, as illustrated in FIG. 4, the tunnel 31 is located above the receptacles 100 advancing on the transfer star-wheel 3 along the advancing path. In particular, the tunnel 31 is located above the mouths 100*a* of the receptacles 100 at a predefined distance from the concave closure 200 placed on the receptacles 100.

The functioning of the aseptic apparatus for filling and closing Aluminium receptacles according to the present is described below.

The receptacles 100 are filled with the products in the filling unit 2, that is inside the controlled-contamination and sterile environment 6.

The filled receptacles 100 are then discharged on the transfer star-wheel 3, in particular in the first zone, where they are subjected to a liquid nitrogen dosing.

In particular, a dosing device (not illustrated) is fixedly located above the receptacles 100 and is configured to continuously dispense liquid nitrogen towards the receptacles 100. The liquid nitrogen then gasifies and create a layer over the product inside the receptacles 100.

Then, the filled receptacles 100 receive the concave closures 200 "on the fly" in the closures placing station 30.

The receptacles 100 with the concave closures 200 placed on their mouths 100*a* continue to travel on the transfer star-wheel 3, following an advancing path below the tunnel 31.

The entrance of contaminants inside the receptacles 100 is prevented thanks to the sterile air flow established in the tunnel 31 and substantially orthogonal to the development direction D.

In addition, the guide element 32 developing along the tunnel 31 maintains the concave closures 200 on the mouths 100*a* of the receptacles 100, also contrasting the entrance of contaminants inside the receptacles 100.

The concave closures 200 placed on the receptacles 100 are then applied to the necks 100*b* by the closing machine 41, that creates the threads in the concave closures 200.

The characteristics of the aseptic apparatus for filling and closing Aluminium receptacles, according to the present, prove to be clearly indicated in the description provided.

In particular, setting a lower overpressure in the closing unit than in the filling unit prevents or limits the contaminants from travelling towards the filling unit.

In addition, arranging the tunnel just after having applied the concave closures "on the fly" allows to protect the products in the receptacles during their travel towards the closing unit.

Moreover, the guide element following the development of the tunnel maintains the concave closures in their position on the mouths of the receptacles. This also avoids or limits the entrance of contaminants within the receptacles.

The result is an aseptic apparatus for filling and closing receptacles made of Aluminium in which sterility is assured along the line without increasing the overall complexity.

In fact, the closing machine for Aluminium receptacles, which is structurally complex and bulky, may be accessed (i.e. open) for maintenance operations without affecting the sterility of the upstream units, whereas a "clean" path is created for the receptacles travelling from the zone where the closures are placed "on the fly" to the closing machine.

In accordance with common practice, the various features illustrated in the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. An aseptic apparatus for filling and closing Aluminium receptacles, the aseptic apparatus comprising:

a filling unit comprising a first chamber housing a filling machine that is configured to receive the receptacles and to inject a product within the receptacles;

at least one transfer star-wheel downstream the filling unit;

a closures placing station arranged on a first zone of the transfer star-wheel that is located beside the filling unit, said closures placing station being configured to place a concave closure onto a mouth of each receptacle, said concave closure being without a thread;

a closing unit downstream the transfer star-wheel, said closing unit comprising a second chamber housing a closing machine that is configured to apply each concave closure around an externally threaded neck of the corresponding receptacle, wherein a thread is created in each concave closure during the application of the concave closure on the neck of the receptacle;

air supplying means for supplying sterile air to the first chamber and to the second chamber, said air supplying means being configured to supply air in such a way that the first chamber is at a first pressure and the second chamber is at a second pressure, the second pressure being lower than the first pressure;

an isolator adapted to define a controlled-contamination and sterile environment, said filling unit, said transfer star-wheel, said closures placing station and said closing unit being arranged inside the isolator.

2. The aseptic apparatus according to claim 1, further comprising:

a tunnel starting downstream the closures placing station, said tunnel surrounding a volume partially extending above the mouths of the receptacles travelling towards the closing unit;

further air supply means for supplying sterile air within the volume delimited by said tunnel so as to create a sterile air flow substantially orthogonal to a development direction of the tunnel.

3. The aseptic apparatus according to claim 2, wherein the tunnel has a development direction that is substantially parallel to an advancing path of the receptacles on the transfer star-wheel so that the tunnel surrounds a volume partially extending above the mouths of the receptacles advancing on the transfer star-wheel.

4. The aseptic apparatus according to claim 2, wherein the tunnel is configured to enwrap at least partially the neck and the concave closure applied on each receptacle advancing on the transfer star-wheel along the advancing path.

5. The aseptic apparatus according to claim 4, wherein the tunnel is configured to enwrap completely the neck and the concave closure applied on each receptacle advancing on the transfer star-wheel along the advancing path.

6. The aseptic apparatus according to claim 2, wherein the tunnel is located above the receptacles advancing on the transfer star-wheel along the advancing path.

7. The aseptic apparatus according to claim 2, wherein the tunnel has a U-shaped cross-section.

8. The aseptic apparatus according to claim 2, further comprising a guide element located under the tunnel and having an elongated extension in a direction that is parallel to the developing direction of said tunnel, the guide element being configured to maintain the concave closures placed on the receptacles advancing on the transfer star-wheel along the advancing path.

9. The aseptic apparatus according to claim 8, wherein the guide element is configured to contact the concave closures placed on the receptacles advancing on the transfer star-wheel along the advancing path.

10. The aseptic apparatus according to claim 1, wherein the first pressure is comprised between 20 Pa and 50 Pa, and the second pressure is comprised between 5 Pa and 30 Pa.

11. The aseptic apparatus according to claim 1, wherein the closures placing station comprises a plurality of guides arranged in such a way as to place said concave closures from on high on the mouth of the receptacles and at least a plane able to exert pressure onto the concave closures once placed on the mouth of the receptacles.

* * * * *